United States Patent Office 3,166,581
Patented Jan. 19, 1965

3,166,581
S - ACYLOXYALKYL AND S - ACYLOXYALKENYL ESTERS OF O,O - DIORGANO - PHOSPHOROTHIOLIC ACIDS
Geert C. Vegter, Herne Bay, Kent, England, assignor to Shell Oil Company, a corporation of Delaware
No Drawing. Filed Nov. 13, 1959, Ser. No. 852,604
Claims priority, application Great Britain, July 18, 1958, 23,137/58; Dec. 23, 1958, 41,489/58
9 Claims. (Cl. 260—456)

This application is a continuation-in-part of my copending application Serial No. 826,442, filed July 13, 1959, and now abandoned.

This invention relates to novel phosphorus-containing esters, valuable as insecticides, and suitable in particular for use as plant-protecting agents.

These new insecticides are the S-acyloxyaliphatic esters of O,O-diesters of phosphorothiolic acids, including phosphorothiolothionic acids wherein each of the ester groups bonded to oxygen is a monovalent organic group, being characterized by the structure of an acyloxyaliphatic radical bonded via the thiolo sulfur atom to the phosphorus atom of phosphorothiolic acid, or of phosphorothiolothionic acid. The new insecticides are characterized by the structural formula:

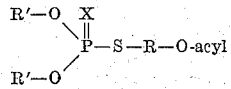

wherein R represents a divalent aliphatic radical, each of R' represents a monovalent organic group—which may be the same group, different groups of the same kind, or different kinds of groups—which is the residue of an alcohol, R'OH, X represents oxygen or sulfur, and "acyl" represents an acyl residue of an acid.

Preferably, R' represents hydrocarbon of up to ten carbon atoms—that is to say, each of R' is a hydrocarbon group, both of the groups together containing up to 10 carbon atoms—or such hydrocarbon groups substituted by one or more nitro groups, one or more halogen atoms or one or more alkoxy groups of up to four carbon atoms. The groups represented by R' may suitably be straight chain, branched chain or cylic in configuration; they may be saturated, olefinically unsaturated or aromatically unsaturated. Preferably, they are free from acetylenic unsaturation. Suitable groups thus include the alkyl groups, the cycloalkyl groups, aralkyl groups, alkaryl groups, aryl groups, alkenyl groups, alkadienyl groups, cycloalkenyl groups, aralkenyl groups, alkenylaryl groups, and the like. The most useful of the new class of compounds are believed to be those wherein R' represents an alkyl group of up to eight carbon atoms, the phenyl group, a nitrophenyl group, or a halophenyl group.

The aliphatic group represented by the symbol, R, preferably contains only carbon atoms in the chain bonding the indicated sulfur atom to the indicated oxygen atom. These carbon atoms may all be saturated carbon atoms, or two or more may be olefinically unsaturated; preferably, none are acetylenically unsaturated. Where olefinic unsaturation is present in the chain, preferably one olefinically unsaturated pair of carbon atoms consists of the alpha and beta carbon atoms relative to the indicated sulfur atom. The carbon chain may be substituted, the preferred substituents being selected from halogen atoms, the cyano group, the nitro group, amino groups and monovalent hydrocarbon substituent groups such as are represented by the symbol R'. Desirably, the group R contains no more that ten carbon atoms, with no more than six carbon atoms in the chain bonding together the indicated sulfur and oxygen atoms, and it is preferred that the group R contain no more than about six carbon atoms, with no more than four carbon atoms in the chain.

In the formula, "acyl" is the acyl group of an acid. By "acyl group" is meant the organic radical derived from an organic acid by the removal of the hydroxyl group. In the case of a carboxylic acid, R"—C(O)—OH, the acyl group is: R"—C(O)—, while in the case of a sulfonic acid, R"—SO₂—OH, the acyl group is: R"—SO₂—. Suitably, the acyl group may be that of an aliphatic carboxylic acid, an aliphatic sulfonic acid (R"=aliphatic), a haloaliphatic carboxylic acid, a haloaliphatic sulfonic acid (R"=haloaliphatic), a phenyl carboxylic acid, a phenyl sulfonic acid (R"=phenyl), or a substituted phenyl carboxylic acid, a substituted phenyl sulfonic acid (R"=substituted phenyl, preferred substituents being halogen, nitro and alkoxy of up to four carbon atoms), an aliphatic carbonic acid (R"=aliphaticoxy), a phenyl carbonic acid (R"=phenyloxy), an amino acid (R"=aminoalkylene, or, preferably (R₃)₂N— alkylene, wherein R₃=H or R'), a carbamic acid (R"=amino, or, preferably, (R₃)₂N), phosphoric acid, a monoester or diester thereof

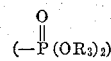

a phosphonic acid or ester thereof

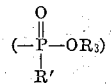

or a phosphinic acid

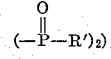

or their sulfur analogs. Preferably, the acyl group contains no more than ten carbon atoms.

In these acyl groups, the aliphatic groups preferably contain only carbon in the chain, and may be either saturated or olefinically unsaturated; preferably, they are free from acetylenic unsaturation. Preferably, each aliphatic group contains not more than 4 carbon atoms. Hydrocarbon aliphatic groups (i.e., alkyl, alkenyl, and both saturated and olefinically unsaturated alkylene groups), and these groups substituted by halogen, are most preferred.

Where the term "halogen" is used herein, it is meant to include all of the four halogen atoms: namely, fluorine, chlorine, bromine and iodine. The preferred halogen atoms are the middle halogens: namely, bromine and chlorine.

As will be evident from the foregoing, there are seven subgenera of the new genus of insecticides which are of particular interest, as follows:

(1) The S-acyloxyalkyl ester of an O,O-dialkyl ester of a phosphorothiolic acid, including phosphorothiolothionic acids, where the acyl group is that of a carboxylic acid, this subgenus having the formula:

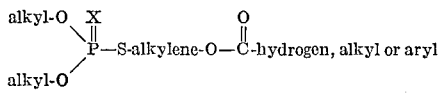

(2) The S-alkyloxyhaloalkyl ester of an O,O-dialkyl ester of a phosphorothiolic acid, including phosphorothiolothionic acids, where the acyl group is that of a carboxylic acid, this subgenus having the formula:

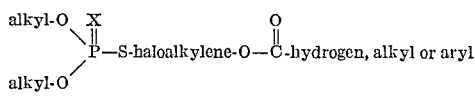

(3) The S-acyloxyalkenyl, including haloalkenyl, ester of an O,O-dialkyl ester of a phosphorothiolic acid, including phosphorothiolothionic acids, where the acyl group is that of a carboxylic acid, this subgenus having the formula:

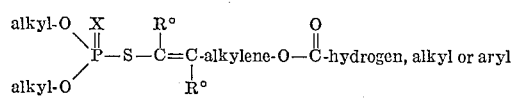

(4) The S-halocycloxyalkyl ester of an O,O-dialkyl ester of a phosphorothiolic acid, including phosphorothiolothionic acids, where the acyl group is that of a carboxylic acid, this subgenus having the formula:

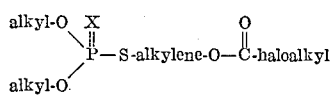

(5) The S-acyloxyalkyl ester of an O,O-dialkyl ester of a phosphorothiolic acid, including phosphorothiolothionic acids, where the acyl group is that of a sulfonic acid, this subgenus having the formula:

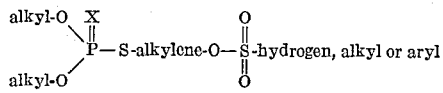

(6) The S-acyloxyalkenyl, including haloalkenyl ester of an O,O-dialkyl ester of a phosphorothiolic acid, including phosphorothiolothionic acids, where the acyl group is that of a sulfonic acid, this subgenus having the formula:

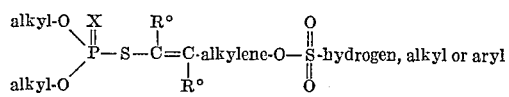

(7) The S-acyloxyalkyl ester of an O-alkyl, O-nitro-substituted phenyl ester of a phosphorothiolic acid, including phosphorothiolothionic acids, where the acyl group is that of a carboxylic acid, this subgenus having the formula:

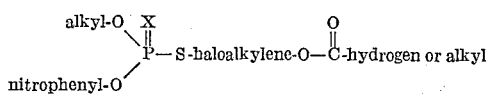

(8) The S-acyloxyalkyl ester of an O-alkyl, O-halogen-substituted phenyl ester of a phosphorothiolic acid, including phosphorothiolothionic acids, where the acyl group is that of a carboxylic acid, this subgenus having the formula

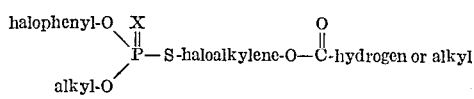

wherein X is oxygen or sulfur, "alkyl" is an alkyl group of from 1 to 4 carbon atoms, "haloalkyl" is an alkyl group (as defined herein) substituted by from one to a plurality of halogen atoms, "haloalkylene" is an alkylene group (as defined herein) substituted by from one to a plurality of halogen atoms, "alkylene" is an alkylene group of from 1 to 6 carbon atoms with from 1 to 4 carbon atoms in the chain linking together the indicated sulfur and oxygen atoms, "aryl" is a mono-nuclear aromatic hydrocarbon group of from 6 to 10 carbon atoms (that is, "aryl" is the phenyl group or alkyl-substituted phenyl groups wherein the alkyl group or groups contain up to 4 carbon atoms), "halophenyl" is a phenyl group substituted from one to a plurality of halogen atoms, and R° is hydrogen, halogen, alkyl of 1 to 4 carbon atoms, or phenyl, and these subgenera 1–6, where one or both of the alkyl groups bonded by oxygen to phosphorus is replaced by a phenyl group.

These new insecticides can be prepared by various processes, which are further features of this invention.

(A) According to one process, the compounds may be prepared by reacting a phosphorus oxy- or thio-halide P(X) (halogen)₃, for example, phosphorus oxychloride or phosphorus thiochloride, with a partial acyl ester, HS—R—O-acyl R and acyl having the respective meanings set out hereinbefore, preferably in the presence of a hydrogen halide acceptor, or with a salt, preferably an alkali metal salt, of said ester, to produce an intermediate compound, (halogen)₂P(X)—S—R—O-acyl This intermediate then is reacted with a hydroxy compound or compounds, R'OH, R' having the meaning set out hereinbefore, preferably in the presence of a hydrogen halide acceptor, or with a salt, preferably an alkali metal salt of said hydroxy compound(s), to give the desired product.

(B) In an alternative, preferred process, the compound

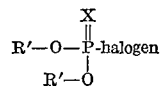

is reacted in similar fashion with the partial ester,

HS—R—O-acyl or a salt thereof, to produce the desired end product, or with a thiolalcohol, HS—R—OH, or with a salt thereof, MS—R—OH (where M represents a salt-forming atom or group, preferably alkali metal or ammonium) to produce an intermediate of formula

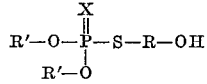

which then can be converted to the acyl ester, for example, by treatment with the appropriate acid, acyl—OH, or acid chloride, acyl—O—Cl, or acid anhydride, acyl—O-acyl or by ester interchange with an ester of such acid with a volatile alcohol. In the foregoing descripiton, all of the symbols have the respective meanings already set out hereinbefore.

(C) According to a further, also preferred, process, a salt of the diester

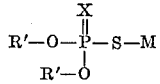

is reacted with a partial acyl ester of formula,

Z'—R—O-acyl wherein Z' represents an atom or group which is split off in the reaction, preferably being a halogen atom, an alkyl sulfuric acid ester, or aryl sulfonate group, to produce the desired end product.

(D) The novel compounds of the invention may also be prepared according to another, also preferred, process by reacting a diester of formula

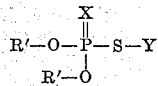

wherein Y represents hydrogen or halogen, preferably chlorine or bromine, with an acyl ester of an ethylenically or acetylenically unsaturated alcohol. The phosphorus-containing moiety becomes attached through the indicated sulfur atom to one carbon atom of the unsaturated linkage and the atom Y becomes attached to the other carbon atom of the unsaturated linkage. This process is illustrated by the reaction between diethoxyphosphorothiolothionic chloride or the corresponding thionic acid and an alkenyl acetate as follows:

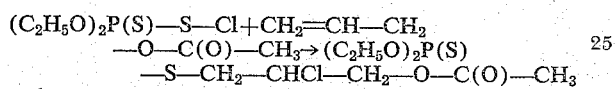

and

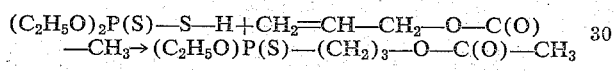

In a similar manner, addition occurs to an acetylenic linkage to produce a compound in which the group R is olefinically unsaturated. Thus, reaction with the acetate of 2-propynol can be expressed by the equations:

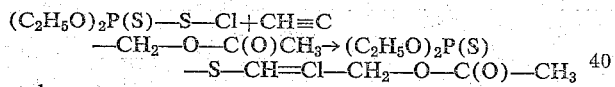

and

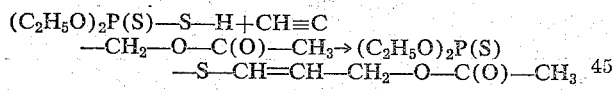

Examples of olefinic and acetylenic alcohols whose esters may be used in the above addition reaction are the esters of vinyl alcohol, $CH_2=CHOH$, allyl alcohol, $CH_2=CH—CH_2OH$, 2-butenol, $CH_3—CH=CH_2OH$, 3-buten-2-ol, $CH_2=CH—C(CH_3)HOH$, 3-butenol,

cinnamyl alcohol, phenyl—$CH=CH—CH_2OH$, 2-propynol, $CH\equiv C—CH_2OH$, 3-butyn-2-ol,

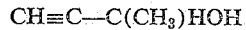

1-phenyl-prop-1-yn-3-ol, phenyl—$CH\equiv C—CH_2OH$, and the like. These alcohols may be substituted by the atoms or groups already set out herein as substituents which may be present in the groups represented by R.

(E) Another, and preferred, process for preparing compounds of the invention employs as starting materials, a new class of compounds having the formula:

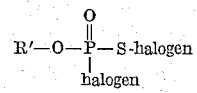

wherein the halogen preferably is chlorine, bromine or fluorine, chlorine being particularly preferred. These new compounds and the method for their preparation form the subject matter of my U.S. Patent No. 3,081,329. In this process, a compound of the foregoing class is reacted with an ester of an olefinically or acetylenically unsaturated alcohol and the resulting phosphorochloridothionate is reacted with a hydroxy compound R'OH. If it is desired that both groups R' in the final product be the same, then R' of the hydroxy compound is the same as R' of the phosphorochloridothionate; if desired, then the groups, R', can be different. The reaction sequence is illustrated by the equations:

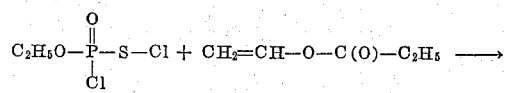

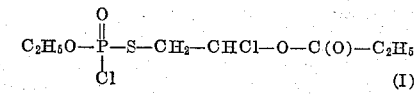

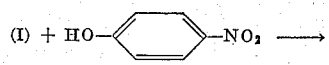

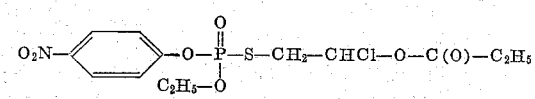

All of the reactions set out above should be carried out under anhydrous conditions. An inert solvent, such as ether, halogenated hydrocarbons such as carbon tetrachloride, or a liquid aliphatic or aromatic hydrocarbon, such as hexane, benzene, xylenes or the like, may be employed to advantage in some cases, but may be omitted if one or more of the reactants are liquid. The addition reactions to unsaturated compounds in some cases proceed vigorously, usually after an induction period of a few minutes; in other cases, it may be necessary to add a small amount of a suitable catalyst which provides or causes generation of free radicals. The usual generators of free radicals such as actinic radiation and organic peroxides, such as benzoyl peroxide, are suitable. These addition reactions are preferably effected initially at below about 40° C., with the reaction mixture eventually being heated at about 70° C. to 80° C. for about an hour to insure completion of the reaction. The other reactions described above are, in general, effected at about 70° C. to 80° C. Reactions involving evolution of a hydrogen halide are preferably effected in the presence of a hydrogen halide acceptor, an organic tertiary nitrogen base such as pyridine or an alkyl pyridine being preferred for this purpose.

When reaction is complete, any precipitate formed can be filtered off and any solvent or other volatile material removed by distillation, preferably under reduced pressure. The residual esters are in general liquids. Some are sufficiently heat-stable to allow distillation in a high vacuum. Less stable liquids can be purified by thorough washing with water, drying and warming in a high vacuum to remove volatile impurities. Solid esters can be purified by recrystallization.

In describing the foregoing processes for preparing the compounds of the invention, extended descriptions of the suitable reactants, including listing of numbers of species of the suitable reactants, have not been included because it is felt that such extended descriptions would be undesirable because they would increase the length of this specification and the complexity of descriptions of the processes without serving any useful purpose, and such detailed descriptions are believed unnecessary to under-standing of the performance of those processes. The reactants, accordingly, have been described in terms of their general structure, it being intended that detailed descriptions are provided by means of the various symbols used, the meanings of those symbols having been set out in detail in the description of the new compounds of the invention.

The following examples illustrate the novel compounds of the invention and a process for their preparation, the parts by weight (p.b.w.) and parts by volume (p.b.v.) bearing the same relation as the kilogram bears to the liter.

EXAMPLE 1

*Preparation of O,O-diethyl-S-2-acetoxyethyl phosphorothiolate*

A solution of 2,6-lutidine (107 p.b.w.; 1 mol) in dry ether (500 p.b.v.) was added slowly to a mixture of 2-mercaptoethyl acetate (120 p.b.w.; 1 mol) and O,O-diethyl phosphorochloridate (173 p.b.w.; 1 mol) dissolved in dry ether (1000 p.b.v.) in a vessel fitted with reflux condenser, stirrer and inlet tube and cooled externally in ice. During the addition, a white precipitate of 2,6-lutidine hydrochloride was formed. After addition was complete, the mixture was allowed to stand for about one hour, the precipitate was filtered off and the filtrate distilled to remove the ether. The residue was then distilled under reduced pressure in an atmosphere of nitrogen yielding after a forerun of unreacted starting materials, the desired ester, O,O-diethyl-S-2-acetoxyethyl phosphorothiolate, boiling point 92–94° C. at 0.01 millimeter mercury pressure. Yield 60%.

EXAMPLE 2

*Preparation of O,O-diethyl-S-2-chloroacetoxy ethyl phosphorothiolate*

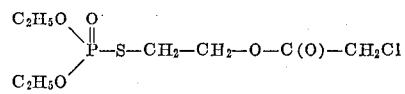

Diethyl phosphorochloridate (17.25 p.b.w.; 0.1 mol) was mixed with 2-mercaptoethyl chloroacetate (15.45 p.b.w.; 0.1 mol). To the stirred mixture, pyridine (7.9 p.b.w.; 0.1 mol) was gradually added. Some heat was evolved and the temperature was kept below 50° C. by external cooling. Some pyridine hydrochloride separated. When the exothermic reaction ceased, the mixture was heated in a water bath to 70° C. for 30 minutes and left overnight. The next day, the reaction mixture was extracted with ether and the ether extract washed with water and dried over anhydrous sodium sulfate. The ether and other low-boiling products were removed by distillation, eventually under 0.05 millimeter mercury pressure and a bath temperature of 80° C. The residue consisted of O,O-diethyl-S-2-chloroacetoxyethyl phosphorothiolate.

A number of compounds prepared according to the method of Example 2 are listed in Table I which also gives the thiol ester reacted with the compound

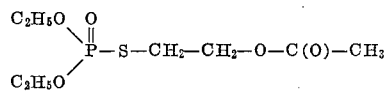

where R' represents a methyl or ethyl group and X represents an oxygen or sulfur atom. The table also gives the yield and analytical data of the products. The corresponding data for the compound of Example I is also included.

TABLE I

| Example No. | Compound | Thiol Ester Starting Material | Product Analysis - Found Percent C | Found Percent H | Found Percent S | Calculated Percent C | Calculated Percent H | Calculated Percent S | Yield, percent of Theory |
|---|---|---|---|---|---|---|---|---|---|
| 1 | O,O-Diethyl S-2-acetoxyethyl phosphorothiolate $$\begin{array}{c}C_2H_5O \\ \phantom{x}\diagdown\phantom{x}\overset{O}{\underset{\phantom{x}}{\|}} \\ \phantom{xxx}P-S-CH_2-CH_2-O-C(O)-CH_3 \\ \phantom{x}\diagup \\ C_2H_5O\end{array}$$ | $HS-CH_2-CH_2-O-C(O)-CH_3$ | 36.2 | 7.0 | 11.9 | 37.5 | 6.6 | 12.5 | 15 |
| 2 | O,O-Diethyl S-2-chloroacetoxyethyl phosphorothiolate. $$\begin{array}{c}C_2H_5O \\ \phantom{x}\diagdown\phantom{x}\overset{O}{\underset{\phantom{x}}{\|}} \\ \phantom{xxx}P-S-CH_2-CH_2-O-C(O)-CH_2Cl \\ \phantom{x}\diagup \\ C_2H_5O\end{array}$$ | $HS-CH_2-CH_2-O-C(O)-CH_2Cl$ | 34.2 | 5.7 | 11.4 | 33.0 | 5.5 | 11.4 | 35 |
| 3 | O,O-Diethyl S-2-isobutyryloxyethyl phosphorodithioate. $$\begin{array}{c}C_2H_5O \\ \phantom{x}\diagdown\phantom{x}\overset{S}{\underset{\phantom{x}}{\|}} \\ \phantom{xxx}P-S-CH_2-CH_2-O-C(O)-CH(CH_3)_2 \\ \phantom{x}\diagup \\ C_2H_5O\end{array}$$ | $HS-CH_2-CH_2-O-C(O)-CH(CH_3)_2$ | | | 21.7 | | | 21.3 | 16 |
| 4 | O,O-Dimethyl S-2-acetoxyethyl phosphorothiolate. $$\begin{array}{c}CH_3O \\ \phantom{x}\diagdown\phantom{x}\overset{O}{\underset{\phantom{x}}{\|}} \\ \phantom{xxx}P-S-CH_2-CH_2-O-C(O)-CH_3 \\ \phantom{x}\diagup \\ CH_3O\end{array}$$ | $HS-CH_2-CH_2-O-C(O)-CH_3$ | 31.4 | 5.8 | 13.8 | 31.6 | 5.7 | 14.0 | 13 |
| 5 | O,O-Diethyl S-2-isobutyryloxyethyl phosphorothiolate. $$\begin{array}{c}C_2H_5O \\ \phantom{x}\diagdown\phantom{x}\overset{O}{\underset{\phantom{x}}{\|}} \\ \phantom{xxx}P-S-CH_2-CH_2-O-C(O)-CH(CH_3)_2 \\ \phantom{x}\diagup \\ C_2H_5O\end{array}$$ | $HS-CH_2-CH_2-O-C(O)-CH(CH_3)_2$ | 43.5 | 7.7 | 10.8 | 42.3 | 7.4 | 11.3 | 31 |

TABLE I—Continued

| Example No. | Compound | Thiol Ester Starting Material | Product Analysis | | | | | | Yield, percent of Theory |
|---|---|---|---|---|---|---|---|---|---|
| | | | Found | | | Calculated | | | |
| | | | Percent C | Percent H | Percent S | Percent C | Percent H | Percent S | |
| 6 | O,O-Diethyl S-2-benzoyloxyethyl phosphorothiolate. $$\begin{array}{c}C_2H_5O\\ \diagdown\\ C_2H_5O\end{array}\!\!\!\!\overset{O}{\underset{}{\overset{\|}{P}}}\!\!-\!S\!-\!CH_2\!-\!CH_2\!-\!O\!-\!C(O)\!-\!\!\!\bigcirc$$ | $HS-CH_2-CH_2-O-C(O)-\bigcirc$ | 47.5 | 5.9 | 9.9 | 49.0 | 6.0 | 10.1 | 15 |

EXAMPLE 7

*Preparation of O,O-diethyl O-acetoxymethyl phosphorodithioate*

$$\begin{array}{c}C_2H_5O\\ \diagdown\\ C_2H_5O\end{array}\!\!\!\!\overset{S}{\underset{}{\overset{\|}{P}}}\!\!-\!S\!-\!CH_2\!-\!O\!-\!C(O)\!-\!CH_3$$

A solution of chloromethyl acetate (10.85 p.b.w.; 1 mol) in acetone (20 p.b.v.) was added to a stirred solution of O,O-diethyl-S-potassium phosphorodithioate (20.8 p.b.w.; 1 mol) in acetone (100 p.b.w.) at room temperature. The mixture was allowed to stand overnight and potassium chloride separated. The following day it was refluxed for four hours. The potassium chloride was removed by filtration and the acetone was removed from the filtrate by evaporation under reduced pressure and other volatile material was removed by distillation under 0.3 millimeter mercury pressure and at a bath temperature of 50° C. The residue was dissolved in ether, the ethereal solution was washed with water and then dried over anhydrous sodium sulfate. The ether was then removed under reduced pressure, leaving a residue of O,O-diethyl O-acetoxymethyl phosphorodithioate. The thiono structure was confirmed by infrared analysis. Yield: 17 p.b.w. (66%). *Analysis.*—Found: C, 32.8; H, 6.0; S, 24.9%. $C_7H_{15}O_4S_2P$ requires C, 32.6; H, 5.8; S, 24.9%.

EXAMPLE 8

*Preparation of O,O-dimethyl-S-acetoxymethyl phosphorodithioate*

$$\begin{array}{c}CH_3O\\ \diagdown\\ CH_3O\end{array}\!\!\!\!\overset{S}{\underset{}{\overset{\|}{P}}}\!\!-\!S\!-\!CH_2\!-\!O\!-\!C(O)\!-\!CH_3$$

A solution of chloromethyl acetate (10.85 p.b.w.; 1 mol) in acetone (10 p.b.v.) was added with stirring to a solution of O,O-dimethyl-S-potassium phosphorodithioate (19.6 p.b.w.; 1 mol) in acetone (100 p.b.v.). The mixture was allowed to stand overnight and potassium chloride separated. The following day is was refluxed for five hours. The potassium chloride was removed by filtration and the filtrate was concentrated to 30 p.b.v. On addition of water (200 p.b.v.) an oil separated. The oil was washed with water and dried over anhydrous sodium sulfate. Distillation under reduced pressure gave 10 p.b.w. (66% yield) of O,O-dimethyl S-2-acetoxymethyl phosphorodithioate, B.P. 100° C. under 0.02 millimeter mercury pressure. *Analysis.*—Found: C, 26.5, H, 4.8; S, 28%, $C_5H_{11}O_4PS_2$ requires C, 26.1; H, 4.9; S, 27.8%.

Examples illustrating the preparation of compounds
 (a) By reacting the compound $$\begin{array}{c}R_1O\\ \diagdown\\ R_2O\end{array}\!\!\!\!P(X)\!-\!SY$$

with an ester of an unsaturated alcohol.

EXAMPLE 9

*Preparation of O,O-diethyl S-2-acetoxy-2-chloroethyl phosphorothiolate*

$$\begin{array}{c}C_2H_5O\\ \diagdown\\ C_2H_5O\end{array}\!\!\!\!P\!-\!S\!-\!CH_2\!-\!CHCl\!-\!O\!-\!C(O)\!-\!CH_3$$

A solution of O,O-diethylphosphorothiolic chloride $$(C_2H_5O)_2\overset{O}{\underset{}{\overset{\|}{P}}}\!-\!SCl$$

(10.2 p.b.w.; 0.05 mol) in benzene (10 p.b.v.) was added to a stirred solution of vinyl acetate (4.3 p.b.w.; 0.05 mol) in benzene (20 p.b.v.) at 30° C. No heat was evolved. The mixture was irradiated with ultraviolet light and after three hours was nearly colorless. It was then washed with water and dried over anhydrous sodium sulfate. On evaporation under reduced pressure, finally at 0.013 millimeter mercury pressure and a bath temperature of 80° C., a residue (10.1 p.b.w.) was left consisting of O,O-diethyl S-2-acetoxy-2-chloroethyl phosphorothiolate.

In an analogous way, the other compounds specified in Table II were prepared from O,O-diethyl phosphorothiolic chloride and the stated unsaturated esters. Table II also gives the percentage yields and analytical data for the compounds prepared by this process.

(b) By reacting the compound $$\begin{array}{c}R_1O\\ \diagdown\\ R_2O\end{array}\!\!\!\!P(X)\!-\!SH$$

with an ester of an unsaturated alcohol.

EXAMPLE 17

*Preparation of O,O-Dimethyl S-2-Acetoxyethyl Phosphorodithioate*

$$\begin{array}{c}CH_3O\\ \diagdown\\ CH_3O\end{array}\!\!\!\!P(S)\!-\!S\!-\!CH_2\!-\!CH_2\!-\!O\!-\!C(O)\!-\!CH_3\ .$$

A mixture of O,O-dimethyl S-hydrogen phosphorodithioate $(CH_3O)_2P(S)$—SH (7.9 p.b.w.; 0.05 mol) and allyl acetate (5.0 p.b.w.; 0.05 mol) was heated with benzoyl peroxide (0.01 p.b.w.) for 24 hours at 70° C.

Vacuum distillation of the reaction mixture yielded O,O-dimethyl S-2-acetoxyethyl phosphorodithioate with B.P. 83° C. at 0.09 millimeter mercury pressure. By similar processes, a number of compounds were prepared by reacting O,O-dimethyl or O,O-diethyl S-hydrogen phosphorodithioate with an unsaturated ester. These are summarized in Table III.

TABLE II

| Example No. | Compound | Unsaturated Ester Starting Material | Product Analysis - Found Per-cent C | Per-cent H | Per-cent S | Per-cent Cl | Product Analysis - Calculated Per-cent C | Per-cent H | Per-cent S | Per-cent Cl | Yield, percent of Theory |
|---|---|---|---|---|---|---|---|---|---|---|---|
| 9 | O,O-Diethyl S-2-acetoxy-2-chloroethyl phosphorothiolate. (C₂H₅O)₂P(S)—S—CH₂—CHCl—O—C(O)—CH₃ | CH₂=CH—O—C(O)—CH₃ | 32.9 | 5.8 | 11.2 | 11.9 | 33.0 | 5.5 | 11.0 | 12.2 | 65 |
| 10 | O,O-Diethyl S-2-chloro-2-propionyl oxyethyl phosphorothiolate. (C₂H₅O)₂P(O)—S—CH₂—CHCl—O—C(O)—C₂H₅ | CH₂=CH—O—C(O)—C₂H₅ | 34.3 | 6.0 | 11.2 | 11.0 | 35.5 | 5.9 | 10.5 | 11.6 | 70 |
| 11 | O,O-Diethyl S-2-chloro-3-formoxypropyl phosphorothiolate. (C₂H₅O)₂P(O)—S—CH₂—CHCl—CH₂—O—C(O)—H | CH₂=CH—CH₂—O—C(O)—H | 31.8 | 5.6 | 10.7 | 12.0 | 33.0 | 5.5 | 11.0 | 12.2 | 83 |
| 12 | O,O-Diethyl S-2-chloro-3-methoxy carbonyl oxypropyl phosphorothiolate. (C₂H₅O)₂P(O)S—CH₂—CHCl—CH₂—O—C(O)—OCH₃ | CH₂=CH—CH₂O—C(O)—OCH₃ | 32.6 | 5.9 | 10.4 | 11.2 | 33.7 | 5.6 | 10.0 | 11.1 | 90 |
| 13 | O,O-Diethyl S-3-acetoxy-2-chloropropyl phosphorothiolate. (C₂H₅O)₂P(O)—S—CH₂—CHCl—CH₂—O—C(O)—CH₃ | CH₂=CH—CH₂—O—C(O)—CH₃ | 35.7 | 6.7 | 10.0 | | 35.5 | 5.9 | 10.5 | | 98 |
| 14 | O,O-Diethyl S-3-acetoxy-2-chloroprop-1-enyl phosphorothiolate. (C₂H₅O)₂P(O)—S—CH=CCl—CH₂—O—CO—CH₃ | CH=C—CH₂—O—C(O)—CH₃ | 35.3 | 5.1 | 11.0 | 11.5 | 35.7 | 5.3 | 10.6 | 11.7 | 90 |
| 15 | O,O-Diethyl S-3-acetoxy-2-chloro-3-cyanopropyl phosphorothiolate. | H₂C=C—CH (CN) O—C(O)—CH₃ | 35.0 | 6.0 | 10.2 | | 36.4 | 5.2 | 9.8 | | 52 |
| 16 | O,O-Diethyl S-2-chloro-4-methyl 4-p-toluenesulfonyloxy but-1-enyl phosphorothiolate. (C₂H₅O)₂P(O)—S—CH=C Cl—CH₂—CH—O—SO₂—C₆H₄—CH₃ (CH₃) | HC=C—CH₂—CH—O—SO₂—C₆H₄—CH₃ (CH₃) | 43.8 | 6.0 | 14.0 | | 43.4 | 5.4 | 14.5 | | 75 |

TABLE III

| Example No. | Compound | Unsaturated Ester Starting Material | Product Analysis ||||||Yield, Percent of Theory |
|---|---|---|---|---|---|---|---|---|---|
| | | | Found ||| Calculated ||| |
| | | | Percent C | Percent H | Percent S | Percent C | Percent H | Percent S | |
| 17 | O,O-Dimethyl S-2-acetoxyethyl phosphorodithioate $(CH_3O)_2$-P(S)-S-$CH_2$-$CH_2$-O-C(O)-$CH_3$ | $H_2C=CH$-O-C(O)-$CH_3$ | 30.3 | 5.6 | 26.4 | 29.5 | 5.3 | 26.2 | 52 |
| 18 | O,O-Dimethyl S-2-propionyloxyethyl phosphorodithioate. $(CH_3O)_2$-P(S)-S-$CH_2$-$CH_2$-O-C(O)-$C_2H_5$ | $H_2C=CH$-O-C(O)-$C_2H_5$ | 33.1 | 6.0 | 25.6 | 32.6 | 5.8 | 24.9 | 90 |
| 19 | O,O-Diethyl S-2-acetoxyethyl phosphorodithioate $(C_2H_5O)_2$-P(S)-S-$CH_2$-$CH_2$-O-C(O)-$CH_3$ | $H_2C=CH$-O-C(O)-$CH_3$ | 35.0 | 6.6 | 23.7 | 35.3 | 6.3 | 23.5 | 90 |
| 20 | O,O-Diethyl S-2-propionyloxyethyl phosphorodithioate. $(C_2H_5O)_2$-P(S)-S-$CH_2$-$CH_2$-O-C(O)-$C_2H_5$ | $H_2C=CH$-O-C(O)-$C_2H_5$ | 37.0 | 6.8 | 22.7 | 37.8 | 6.6 | 22.7 | 95 |

EXAMPLE 21

*Preparation of O-ethyl O-p-nitrophenyl S-2-chloro-2-propionyloxyethyl phosphorothiolate*

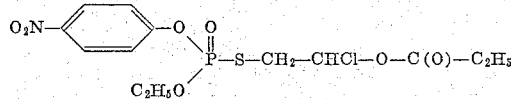

(a) *Preparation of the intermediate O-ethyl S-2-chloro-2-propionyloxyethyl phosphorochloridothionate*

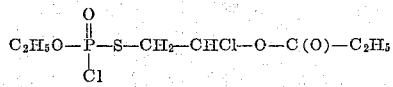

Sulfuryl chloride (40.5 p.b.w.; 0.3 mol) was added with stirring to diethyl phosphorochloridothionate (56.6 p.b.w.; 0.3 mol), the reaction temperature being kept below −10° C. After the addition was complete, stirring was continued for a further 30 minutes at −10° C. Vinyl propionate (30 p.b.w.; 0.3 mol) was then added with stirring, the temperature being kept at −10° C. during the addition. The reaction mixture was then allowed to come to room temperature and the ethyl chloride and sulfur dioxide formed were removed by distillation at 13 millimeters mercury pressure from a bath at room temperature. The residue in the vessel consisted of the desired intermediate (98% yield).

(b) *Preparation of O-ethyl-O-p-nitrophenyl S-2-chloro-2-propionyloxyethyl phosphorothiolate.*—The intermediate prepared in (a) (29.5 g.; 0.1 mol) was added to p-nitrophenol (13.9 p.b.w.; 0.1 mol) and 1,2-dichloroethane (50 p.b.v.) added to aid solution of the phenol. Pyridine (7.9 p.b.w.; 0.1 mol) was then added with stirring, the temperature of the exothermic reaction being kept below 40° C. by external cooling. When addition was complete, the reaction mixture was warmed to 65° C. and kept at this temperature for 15 minutes. After standing overnight, the mixture was diluted with 1,2 dichloroethane (500 p.b.v.) and this solution was washed once with water, twice with 5% aqueous sodium bicarbonate solution and again with water and then dried over anhydrous magnesium sulfate. The solvent and other low-boiling products were removed by distillation under reduced pressure, finally at 0.004 millimeter mercury pressure and a bath temperature of 60° C. The residue, a viscous brown oil, consisted of O-ethyl O-p-nitrophenyl S-2-chloro-2-propionyloxyethyl phosphorothiolate. Yield, 12 p.b.w. (30%). *Analysis.*—Found: N, 3.7; S, 8.4; Cl, 8.4%. $C_{13}H_{17}O_7NSClP$ requires N, 3.5; S, 8.1; Cl, 8.9%. In a similar way was prepared the o-nitrophenyl derivative.

EXAMPLE 22

*Preparation of O-ethyl O-2,4 dichlorophenyl S-2-chloro-2-propionyloxyethyl phosphorothiolate*

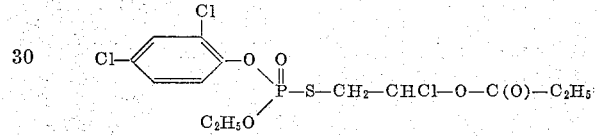

O-ethyl S-2-chloro-2-propionyloxyethyl phosphorochloridothionate prepared as described in Example 21(a) (29.5 p.b.w.; 0.1 mol) and 2,4-dichlorophenol (16.3 p.b.w.; 0.1 mol) were dissolved in benzene (50 p.b.v.). To this solution was added pyridine (7.9 p.b.w.; 0.1 mol) with stirring, the reaction temperature being kept below 40° C. When the addition was complete, the mixture was warmed to 65° C. and kept at this temperature for 15 minutes. After standing overnight, benzene (600 p.b.v.) was added and the solution washed twice with water and dried over anhydrous sodium sulfate. The benzene and other volatile products were removed by distillation under reduced pressure, finally at 0.003 millimeter mercury pressure and a bath temperature of 75° C. The residue, a dark brown oil, consisted of O-ethyl O-2,4 dichlorophenyl S-2 - chloro - 2 - propionyloxyethyl phosphorothiolate. Yield, 23 p.b.w. (58%). *Analysis.*—Found: C, 39.1; H, 3.9; S, 6.9; Cl, 27.0%. $C_{13}H_{16}O_5SCl_3P$ requires C, 37.0; H, 3.8; S, 7.6; Cl, 25.3%. In a similar way the 2-chloro- 3,4-dichloro- and 2,4,5-triphenyl derivatives were prepared.

The invention provides insecticidal compositions which are characterized by high toxicity towards insects, but substantially no toxicity towards plant life, so that these insecticidal compositions can be effectively used for eradication of insects and similar pests and for protection of plant life against the ravages of insects. By the term "insects" is meant not only the members of the class Insecta, but also relates to similar organisms belonging to allied classes of anthropods, and including mites, ticks, spiders, wood lice, and the like.

The new insecticidal compositions include liquid solutions and dispersions of the active ingredients in a suitable liquid carrier, these compositions being suitable for application in the form of sprays or dips, or by means of brushing. Suitable liquid carriers are those which are well-known in the art to be non-toxic to plants, and include such materials as kerosene, or similar light mineral oil distillates of intermediate viscosity and volatility. In addition to such carriers, other adjuvants may be employed to enhance the effectiveness of the toxic materials. Such other adjuvants include spreading or wetting agents such as fatty acid soaps, rosin salts, saponins, gelatin, casein, or other proteinaceous material, or synthetic wetting agents of the type of sulfates of long-chain fatty alcohols, alkyl aryl sulfonates, long-chain alkyl sulfonates, phenol-ethylene oxide condensates, $C_{12}$ to $C_{20}$ amines, and the like. The solution of the toxic material may be dispersed or emulsified in water, and the resulting dispersion or emulsion applied as the spray.

The new insecticidal compositions may be in the form of finely divided solids, the active material being combined with a finely divided solid carrier such as talc, bentonite, lime, gypsum, pyrophillite or the like. The compositions may also contain sticking agents, emulsifying agents or other materials which enhance the effectiveness of the toxic materials.

If desired, the composition may be in the form of an aerosol, the toxic material being dispersed into the air, or atomized into a spray, by means of a compressed gas.

The new insecticides provided by this invention are effective systemic poisons. According to this invention, compositions containing these toxic materials are used as systemic insecticides by applying them to the soil in the vicinity of the growing plant which it is desired to protect, or directly to the plant itself, the toxic material being absorbed by the plant and distributed throughout the tissues thereof, with the result that the plant as a whole acquires toxicity to insects which consume its edible portions.

The concentration of toxic material in our insecticidal compositions will depend on many factors, such as the particular toxic material or materials which are used, the carrier used, the method and conditions of application, the insect species to be controlled, etc., the proper consideration of these factors being within the skill of those versed in the art. In general, the toxic materials hereinbefore-described will be effective in concentrations of from about 0.01% to about 0.5% by weight, based upon the total weight of the composition, although, depending upon the circumstances, as little as about 0.001% or as much as 2% or even more of the toxic material may be employed effectively.

In our new compositions, the toxic agents hereinbefore-described may be employed as the sole toxic ingredient, or they may be employed in conjunction with other insecticidally active materials. Such other insecticidally active materials include, without being limited to, the naturally occurring insecticides, such as pyrethrum, rotenone, sabidilla, and the like, as well as synthetic materials such as compounds of arsenic, lead, and/or fluorine; DDT, benzene hexachloride, thiodiphenylamine, cyanides, O,O-diethyl-O-p-nitrophenyl thiophosphate, azobenzene, and the like.

Particularly suitable compound of the invention for use in the insecticidal compositions of the invention are the following:

O,O-diethyl S-2-acetoxyethyl phosphorothiolate

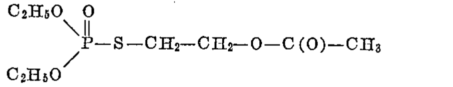

O,O-dimethyl S-2-propionyloxyethyl phosphorodithioate 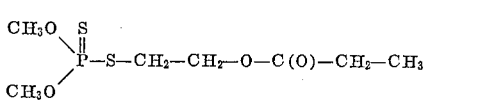 these being typical species of subgenus (1) described in column 3;

O,O-diethyl S-2-chloro-2-acetoxyethyl phosphorothiolate

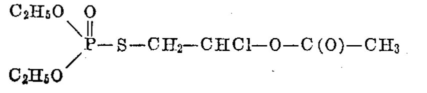

O,O-diethyl S-3-acetoxy-2-chloropropyl phosphorothiolate 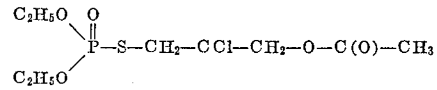 these being typical species of subgenus (2) described in column 3;

O,O-diethyl S-3-acetoxy - 2 - chloroprop-1-enyl phosphorothiolate

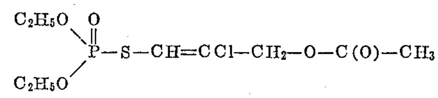

O,O - diethyl S-3-acetoxy-2-chloro-3-phenylprop-1-enyl phosphorothiolate 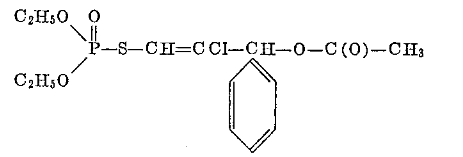 and these being typical species of subgenus (3) described column 3;

All these compounds are at least as toxic as the known insecticides methyl parathion (MP) to red spider mites, *Tetranychus telarius* (Linn.) and some are considerably more active, as can be seen from Table IV, where the figures in the second row of the last column denote the toxicities relative to methyl parathion. O,O-diethyl S-2-acetoxyethyl phosphorothiolate, which is eight times as active as methyl parathion against red spider mites and kills all the insect species tested, is a particularly useful compound, so also is O,O-dimethyl S-2-propionyloxyethyl phosphorodithioate, which is not only twice as active as methyl parathion against red spider mites but also highly selective in its action, being active only on mosquito larvae of the remaining test insects.

The formulation and use of insecticidal compositions of this invention is illustrated in the following examples, which illustrate the preparation and use of typical insecticidal compositions of this invention.

EXAMPLE 23

A 1% by weight solution in acetone of each of the chemicals obtained in the previous examples was prepared.

The solution was applied topically to twenty adult female house flies, *Musca domestica,* at the rate of 1 milliliter of solution per fly.

To 100 milliliters of water containing 0.1 milliliter of the test solution were added twenty mosquito larvae, *Aedes aegypti* (yellow fever mosquito).

Hardened filter paper, 9 centimeters in diameter, was placed in a petri dish and evenly impregnated with 1 milliliter of the test solution and the solvent allowed to evaporate. Five adult male German cockroaches, *Blatella germanica,* were exposed to one paper, and ten adult flour beetles, *Tribolium confusum,* to another.

In tests against diamond-back month larvae, *Plutella maculipennis* (Curtis), and pea aphids, *Acyrthosiphon pisum* (Harns), turnip and broad bean plants, trimmed to one leaf each, were sprayed on the under surface of the leaf with a 1.6% by weight suspension of the chemical in a 0.25% by weight aqueous solution of Triton X 100 as wetting agent, prepared in a micro-wet grinder. Spraying was effected with a paint-type spray gun delivering 17 gallons per acre at 50 pounds per square inch pressure, the plants passing under the spray on a moving belt. Ten moth larvae and ten aphids respectively were placed on the sprayed leaves and each plant then enclosed in a glass cylinder fitted at one end with a muslin cap.

In tests against red spider mite, *Tetranychus telarius* (Linn.), discs 6 centimeters in diameter cut from previously infested French bean leaves were placed on damp filter paper and sprayed at the same time as the turnips and bean plants.

For comparative purposes, similar tests were carried out against red spider mite using the standard insecticide methyl parathion (MP).

In all these tests, mortality counts were made 24 and 48 hours later. The results of these tests are summarized in the following table, where A denotes 100% kill, and B denotes some kill.

TABLE IV

| Name of Chemical | Insect | | | | | | |
|---|---|---|---|---|---|---|---|
| | Musca domestica | Blatella germanica | Tribolium confusum | Aedes aegypti larvae | Plutella maculipennis | Acyrthosiphon pisum | Tetranychus telarius |
| O,O-diethyl S-2-acetoxyethyl phosphorothiolate | A | A | A | A | A | A | A |
| O,O-dimethyl S-2-propionyloxyethyl phosphorodithioate | | | | A | C | C | $8 \times \frac{MP}{A}$ |
| O,O-diethyl S-2-chloro-2-acetoxyethyl phosphorothiolate | A | A | A | B | C | A | $2 \times \frac{MP}{A}$ |
| O,O-diethyl S-3-acetoxy-2-chloroprop-1-enyl phosphorothiolate | A | A | A | B | B | A | $1 \times \frac{MP}{A}$ |
| O,O-diethyl S-3-acetoxy-2-chloro-3-phenylprop-1-enyl phosphorothiolate | A | A | A | B | B | A | $1 \times \frac{MP}{A}$ |
| O,O-diethyl S-3-acetoxy-2-chloropropyl phosphorothiolate | A | A | A | B | B | A | $>1 \times \frac{MP}{A}$ |
| O-Ethyl O-p-nitrophenyl S-2-chloro-2-propionyloxyethyl phosphorothiolate | B[1] | B[1] | | | A[2] | A[2] | $>1 \times \frac{MP}{A}$[2] |
| O-Ethyl O-2,4-dichlorophenyl S-2-chloro-2-propionyloxyethyl phosphorothiolate | | | | | | | A[2] |

[1] In these tests, the dosage was one-tenth of the dosage used in the previous tests.
[2] In these tests, the dosage was two-sevenths of the dosage used in the previous tests.

I claim as my invention:
1. The ester having the formula:

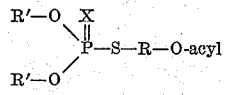

wherein R' represents a member of the group consisting of alkyl from 1 to 8 carbon atoms, phenyl, nitro-substituted phenyl and halogen substituted phenyl, R contains up to 10 carbon atoms and is a member of the group consisting of alkenylene and halogen-substituted alkenylene, and acyl represents the actyl moiety of an acid of the group consisting of alkanemonocarboxylic acids of up to 4 carbon atoms, mononuclear aromatic hydrocarbon monocarboxylic acids of from 6 to 10 carbon atoms and mononuclear aromatic hydrocarbon sulfonic acids of from 6 to 10 carbon atoms, and X represents a member of the group consisting of oxygen and sulfur.

2. The ester having the formula of claim 1 wherein X represents oxygen, R' represents alkyl of from 1 to 8 carbon atoms, R is alkenylene of up to 10 carbon atoms and acyl is the acyl moiety of an alkanemonocarboxylic acid of up to 4 carbon atoms.

3. The ester having the formula of claim 1 wherein X represents oxygen, R' represents alkyl of from 1 to 8 carbon atoms, R is alkylene of up to 10 carbon atoms and acyl represents the acyl moiety of a mononuclear aromatic hydrocarbon sulfonic acid of from 6 to 10 carbon atoms.

4. The ester having the formula of claim 1 wherein X represents sulfur, R' represents alkyl of from 1 to 8 carbon atoms, R is alkenylene of up to 10 carbon atoms, and acyl is the acyl moiety of a lower alkanemonocarboxylic acid.

5. The ester having the formula of claim 1 wherein X represents sulfur, R' represents alkyl of from 1 to 8 carbon atoms, R is alkylene of up to 10 carbon atoms and acyl represents the acyl moiety of a mononuclear aromatic hydrocarbon sulfonic acid of from 6 to 10 carbon atoms.

6. The ester having the formula:

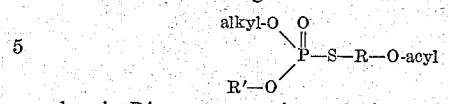

wherein R' represents nitro-substituted phenyl, alkyl represents alkyl of from 1 to 8 carbon atoms, R represents haloalkylene of up to 10 carbon atoms, and acyl represents the acyl moiety of an alkanemonocarboxylic acid of up to 4 carbon atoms.

7. The ester having the formula:

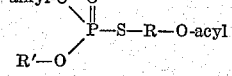

wherein R' represents halogen-substituted phenyl, alkyl represents alkyl of from 1 to 8 carbon atoms, R represents haloalkylene of up to 10 carbon atoms, and acyl represents the acyl moiety of an alkanemonocarboxylic acid of up to 4 carbon atoms.

8. O-ethyl O-p-nitrophenyl S-2-chloro-2-propionyloxyethyl phosphorothiolate.

9. O-ethyl O-2,4-dichlorophenyl S-2-chloro-2-propionyloxyethyl phosphorothiolate.

References Cited by the Examiner

UNITED STATES PATENTS 2,862,019 11/58 Schrader _____ 260—461
2,912,450 11/59 McConnell et al. _____ 260—461
2,945,053 7/60 McConnell et al. _____ 260—461
2,947,775 8/60 Coover et al. _____ 260—461

OTHER REFERENCES

Mel'nikov et al.: "Chem. Abst.," vol. 48, col. 556–557 (1954).

Gar et al.: "Chem. Abst.," vol. 48, col. 6639 (1954).

Melnikov et al.: "J. Gen. Chem. U.S.S.R." (English trans.), vol. 23, pp. 1417–1420(a) (1953).

Paikin et al.: "Chem. Abst.," vol. 42, col. 4096–4097 (1958).

Mastryukova: "Chem. Abst.," vol. 51, col. 18441 (1957).

CHARLES B. PARKER, *Primary Examiner.*

ABRAHAM H. WINKELSTEIN, LESLIE H. GASTON, MORRIS LIEBMAN, *Examiners.*